(12) United States Patent
Ogawa et al.

(10) Patent No.: US 7,128,802 B2
(45) Date of Patent: Oct. 31, 2006

(54) MANUFACTURING METHOD OF COMPRESSIBLE PRINTING LAYER AND MANUFACTURING METHOD OF BLANKET FOR PRINTING

(75) Inventors: Yoshiharu Ogawa, Ibaraki (JP); Akiyoshi Inoue, Ibaraki (JP); Atsuo Sato, Ibaraki (JP); Shigeru Uchioke, Ibaraki (JP)

(73) Assignee: Kinyosha Co., Ltd., Tokyo (JP)

( * ) Notice: Subject to any disclaimer, the term of this patent is extended or adjusted under 35 U.S.C. 154(b) by 302 days.

(21) Appl. No.: 10/422,504

(22) Filed: Apr. 24, 2003

(65) Prior Publication Data
US 2003/0183984 A1 Oct. 2, 2003

Related U.S. Application Data

(63) Continuation of application No. PCT/JP01/10616, filed on Dec. 5, 2001.

(51) Int. Cl.
*B29C 65/02* (2006.01)

(52) U.S. Cl. .............. 156/307.7; 425/335; 425/471; 432/60

(58) Field of Classification Search ........... 425/369, 425/335, 471; 432/60, 228
See application file for complete search history.

(56) References Cited

U.S. PATENT DOCUMENTS

| 2,093,904 | A | * | 9/1937 | Bierer | 442/105 |
| 3,174,228 | A | * | 3/1965 | Smith, Jr. | 34/556 |
| 3,801,250 | A | * | 4/1974 | Kaiser et al. | 425/224 |
| 4,770,928 | A | * | 9/1988 | Gaworowski et al. | 442/221 |
| 5,492,465 | A | * | 2/1996 | Matuzawa et al. | 425/214 |
| 6,287,638 | B1 | * | 9/2001 | Castelli et al. | 427/381 |
| 2002/0166918 | A1 | * | 11/2002 | Takahashi et al. | 242/555.6 |

FOREIGN PATENT DOCUMENTS

| EP | 0987125 | 3/2000 |
| JP | 61091 | 1/1994 |
| JP | 6597749 | 8/1994 |
| JP | 2670188 | 7/1997 |

OTHER PUBLICATIONS

English-language translation of International Search Report dated Mar. 12, 2002 in connection with International Application No. PCT/JP01/10616.
English-language translation of International Preliminary Examination Report dated Feb. 3, 2003 in connection with International Application No. PCT/JP01/10616.

* cited by examiner

*Primary Examiner*—Sam Chuan Yao
*Assistant Examiner*—Barbara J. Musser
(74) *Attorney, Agent, or Firm*—John P. White, Esq.; Cooper & Dunham LLP

(57) ABSTRACT

The present invention provides a manufacturing method of a compressible printing layer, comprising a vulcanizing step comprising a first heating process in which one surface of a compressible printing layer including an unvulcanized compressible layer containing microcapsules is heated by bringing the one surface of the compressible printing layer into contact with the surface of at least one heated metal roll while applying tension to the compressible printing layer, and a second heating process in which the other surface of the compressible printing layer is heated by bringing the other surface of the compressible printing layer into contact with the surface of at least one heated metal roll while applying tension to the compressible printing layer.

6 Claims, 3 Drawing Sheets

MANUFACTURING METHOD OF COMPRESSIBLE PRINTING LAYER AND MANUFACTURING METHOD OF BLANKET FOR PRINTING

CROSS-REFERENCE TO RELATED APPLICATIONS

This is a Continuation Application of PCT Application No. PCT/JP01/10616, filed Dec. 5, 2001, which was not published under PCT Article 21(2) in English.

BACKGROUND OF THE INVENTION

1. Field of the Invention

The present invention relates to a manufacturing method of a compressible printing layer and a manufacturing method of a blanket for printing.

2. Description of the Related Art

Four manufacturing methods of a compressible layer of a compressible rubber blanket, which is an example of the blanket for printing, are known to the art, including (1) a method using an impregnated paper sheet, (2) a salt leaching method, (3) a foaming agent method, and (4) a microcapsule method. In recent years, a blanket equipped with a compressible layer manufactured by the microcapsule method attracts attentions.

Jpn. Pat. Appln. KOKAI Publication No. 6-1091 discloses a method of manufacturing a compressible rubber blanket including at least one reinforcing layer. It is disclosed that a compressible layer comprising an oil resistant rubber mixture and microballoons contained in the oil resistant rubber mixture, said microballoon being formed of a methacrylonitrile-acrylonitrile copolymer having a thermal deformation temperature not lower than 120° C. and a pressure resistance of 40 kg/cm$^2$, is made integral with a surface rubber layer, followed by vulcanizing simultaneously the compressible layer and the surface rubber layer under temperatures not lower than 120° C. so as to manufacture a compressible rubber blanket.

Concerning the vulcanizing method, the Japanese patent document quoted above teaches under the paragraph [0032] that a rubber blanket provided with an unvulcanized compressible layer is wound around a metal drum, and the metal drum is put inside a double-walled can having a steam of 150° C. introduced on the outside so as to heat the rubber blanket and finish the vulcanization.

However, if a rubber blanket provided with an unvulcanized compressible layer is wound around a metal drum, a high pressure in the thickness direction is applied to that portion of the rubber blanket which is positioned on the inner circumferential side. As a result, a buckling deformation is generated in the microcapsule contained in the rubber blanket on the inner circumferential side so as to increase the nonuniformity in the thickness of the compressible layer in the longitudinal direction. The nonuniformity in the thickness of the compressible layer brings about nonuniformity in the compressibility of the blanket so as to cause nonuniformity in the printability.

It should also be noted that, if the vulcanization is carried out by the method described under the paragraph [0032] of the Japanese patent document quoted above, the heat transmission to the rubber blanket is carried out substantially completely through the air, with the result that the heat diffusion rate to the rubber blanket is lowered so as to prolong the vulcanizing time.

On the other hand, Japanese Patent No. 2670188 discloses a manufacturing method of a compressible printing layer. According to the Japanese patent document quoted above, a plurality of thermoplastic microballoons having a melting temperature not lower than 135° C. are uniformly dispersed into the entire region of an elastomer matrix. Then, the surface of a base fabric layer is coated in a uniform thickness with the elastomer matrix containing the microballoons so as to form a coated base fabric layer. Further, the coated base fabric layer is subjected to a vulcanizing treatment at 80 to 150° C. for 1 to 6 hours so as to fix the positions of the thermoplastic microballoons having the high melting point within the matrix and, thus, to form a compressible layer. It is taught that the microballoons impart a uniform compression characteristics to the compressible layer.

It is taught in column 12, lines 42 to 50, of the Japanese patent document quoted above that, in the manufacturing method outlined above, the vulcanizing treatment is carried out by hanging the unvulcanized compressible layer within a furnace, by a continuous curing method such as a drum wrapping method or a rotocuring method, or by a curing method using a double belt press.

However, if the vulcanizing treatment is carried out by the hanging method, the heat transmission to the compressible layer is carried out through the air so as to lower the heating rate of the compressible layer, with the result that a long time is required for the vulcanizing treatment. In addition, force is exerted to the compressible layer at the fulcrum for supporting the compressible layer so as to make it difficult to render uniform the thickness of the compressible layer.

Also, if the vulcanizing treatment is carried out by the drum wrapping method, the thickness of the compressible layer is rendered nonuniform and a long vulcanizing time is required for the reason described above.

Further, in the rotocuring method, the vulcanizing treatment is carried out while applying pressure to the compressible layer, with an unvulcanized compressible layer held between a heated metal roll and a metal belt. On the other hand, in the double belt press method, the vulcanizing treatment is carried out while applying pressure to the compressible layer, with an unvulcanized compressible layer held between two heated belts. Each of these vulcanizing methods gives rise to the problem that it is difficult to make uniform the thickness of the compressible layer because it is difficult to maintain constant the pressure applied to the compressible layer.

Further, Jpn. Pat. Appln. KOKOKU Publication No. 6-59749 discloses a manufacturing method of a compressible blanket for printing. It is disclosed that a compressible intermediate layer prepared by dispersing microcapsules formed of, for example, an acrylonitrile-vinylidene chloride copolymer into an elastomer material is vulcanized for 1 to 12 hours under temperatures lower than the melting point of the microcapsule, e.g., at about 110 F (43° C.) to 170 F (70° C.), so as to fix the microcapsules within the elastomer material. In the method disclosed in the Japanese patent document quoted above, the vulcanization is carried out under low temperatures and, thus, used is an ultra vulcanization accelerator such as dithiocarbamate. Also, in the method disclosed in the Japanese patent document quoted above, cloth and a surface rubber layer are attached to the vulcanized compressible intermediate layer, followed by carrying out an essential vulcanizing treatment under temperatures of 132° C. to 160° C. so as to obtain a final product. In other words, the vulcanizing treatment is carried out in two stages in the method disclosed in the Japanese patent document quoted above.

BRIEF SUMMARY OF THE INVENTION

An object of the present invention is to provide a manufacturing method of a compressible printing layer small in nonuniformity of the thickness and a manufacturing method of blanket for printing which permits decreasing the nonuniformity in the thickness of a compressible printing layer.

According to a first aspect of the present invention, there is provided a manufacturing method of a compressible printing layer, comprising a vulcanizing step comprising:

a first heating process in which one surface of a compressible printing layer including an unvulcanized compressible layer containing microcapsules is heated by bringing the one surface of the compressible printing layer into contact with the surface of at least one heated metal roll while applying tension to the compressible printing layer; and a second heating process in which the other surface of the compressible printing layer is heated by bringing the other surface of the compressible printing layer into contact with the surface of at least one heated metal roll while applying tension to the compressible printing layer.

According to a second aspect of the present invention, there is provided a manufacturing method of a blanket for printing comprising a compressible printing layer, wherein the compressible printing layer is prepared by a method comprising:

a first heating process in which one surface of a compressible printing layer including an unvulcanized compressible layer containing microcapsules is heated by bringing the one surface of the compressible printing layer into contact with the surface of at least one heated metal roll while applying tension to the compressible printing layer; and a second heating process in which the other surface of the compressible printing layer is heated by bringing the other surface of the compressible printing layer into contact with the surface of at least one heated metal roll while applying tension to the compressible printing layer.

According to a third aspect of the present invention, there is provided a manufacturing method of a blanket for printing, comprising:

a first heating process in which one surface of a compressible printing layer including an unvulcanized compressible layer containing microcapsules is heated by bringing the one surface of the compressible printing layer into contact with the surface of at least one heated metal roll while applying tension to the compressible printing layer;

a second heating process in which the other surface of the compressible printing layer is heated by bringing the other surface of the compressible printing layer into contact with the surface of at least one heated metal roll while applying tension to the compressible printing layer;

preparation of a laminate structure including an unvulcanized surface rubber layer, at least two fabric layers, and the vulcanized compressible printing layer arranged between the unvulcanized surface rubber layer and the at least two fabric layers; and application of a vulcanizing treatment to the laminate structure.

DETAILED DESCRIPTION OF THE INVENTION

Figure 1:
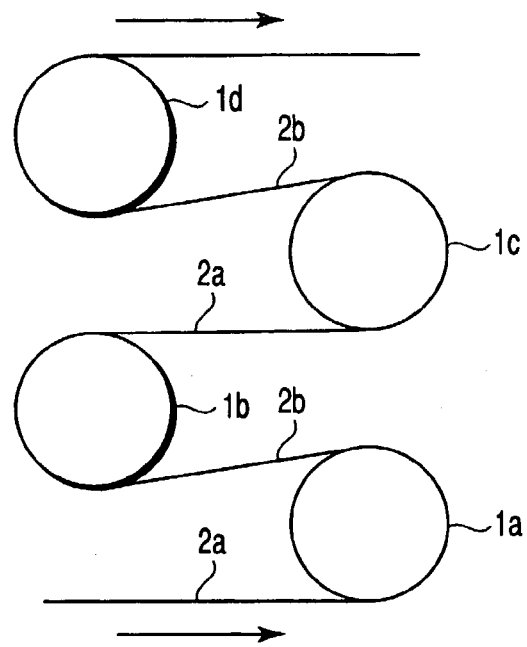
FIG. 1 schematically shows an example of the arrangement of metal rolls used in the vulcanizing process included in the manufacturing method of the compressible printing layer of the present invention.

The manufacturing method of a compressible printing layer according to the present invention will now be described. The compressible printing layer can be used in, for example, a blanket for printing.

(First Process)

Prepared is a compressible printing layer including an unvulcanized compressible layer containing microcapsules.

In order to maintain constant the tension applied to the compressible printing layer in a second process described herein later, it is desirable to form a fabric layer on at least one surface of an unvulcanized compressible layer. Particularly, it is more desirable to form the fabric layers on both surfaces of the unvulcanized compressible layer so as to permit a predetermined tension to be applied to the compressible printing layer.

The unvulcanized compressible printing layer is prepared, for example, as follows. In the first step, prepared is a rubber mixture containing a rubber material, microcapsules and a solvent. The unvulcanized compressible printing layer is obtained by coating a first fabric layer with the rubber mixture so as to form an unvulcanized compressible layer, followed by attaching a second fabric layer to the rubber mixture. It is possible to use, for example, a cotton cloth as the fabric layer.

In the case of performing a printing operation by using an ink prepared by using a polar solvent, it is possible to use as the rubber material a polar polymer such as acrylonitrile-butadiene rubber (NBR), chloroprene rubber (CR), fluorine-contained rubber (FKM) or polyurethane rubber (UR). On the other hand, in the case of performing a printing operation by using an ink prepared by using a polar solvent, it is possible to use as the rubber material a nonpolar polymer such as ethylene-propylene rubber (EPDM) or butyl rubber (IIR). It is possible for the rubber mixture to contain as required an additive in addition to the rubber material. The additives used in the present invention include, for example, a vulcanizing agent, a vulcanization accelerating agents such as D.M (dibenzothiazole, disfide) and M (2-mercapto benzothiazole), an antioxidant, a reinforcing agent, a filler, and a plasticizer.

In the method disclosed in Japanese Patent Publication No. 6-59749, used is dithiocarbamate, which is an ultra vulcanization accelerator, and the rubber is vulcanized under temperatures at which the microcapsules are not melted so as to fix the microcapsules, as described previously. This implies that the rubber paste mixed with microcapsules is unstable even under room temperature. In other words, it is possible for the rubber paste to be subjected to an early vulcanization during preparation and storage of the rubber paste.

It is desirable for the microcapsule to be formed of a thermoplastic resin. The thermoplastic resins used in the present invention for preparing the microcapsules include, for example, a methacrylonitrile-acrylonitrile copolymer, an acrylonitrile-vinylidene chloride copolymer, homopolymers and copolymers of a vinylidene halide, fluorine-containing plastic materials, polyallyl ether ketones, nitrile resins, polyamide imides, polyarylates, polybenzoimidazoles, polycarbonates, thermoplastic polyesters, polyether imides, polyamides, polymethyl pentene, a modified polyphenylene oxide, polyphenylene sulfide, polypropylene and chlorinated polyvinyl chloride. The microcapsules can be prepared by using a single or a plurality of materials selected from among the thermoplastic resins exemplified above. Incidentally, it is desirable for the methacrylonitrile-acrylonitrile copolymer to have a thermal deformation temperature not lower than 120° C. and a pressure resistance of 4 MPa.

Particularly, it is desirable to use a mixture of microcapsules containing microcapsules having a low melting point and microcapsules having a melting point higher than that of the low melting point microcapsules. In the case of using the mixed microcapsules noted above, it is possible to overcome the phenomenon in the blanket for printing that the compressive stress is rendered substantially constant in spite of the increase in the smash thickness.

It is desirable for the low melting point microcapsule to have a melting point falling within a range of between 80° C. and 120° C. Particularly, it is desirable for the low melting point microcapsule to contain an acrylonitrile-vinylidene chloride copolymer as a constituting component. On the other hand, it is desirable for the high melting point microcapsule to have a melting point falling within a range of between 130° C. and 180° C. Particularly, it is desirable for the high melting point microcapsule to contain a methacrylonitrile-acrylonitrile copolymer as a constituting component.

It is desirable for the mixing ratio (weight ratio) $M_H:M_L$ of the high melting point microcapsules ($M_H$) to the low melting point microcapsules ($M_L$) to fall within a range of between 80:20 and 99:1. If the mixing ratio of the low melting point microcapsules ($M_L$) is higher than 20, the breakage of the microcapsules in the vulcanizing step is rendered visible so as to make the compressible layer excessively compressible (excessively soft), with the result that the function of the compressible layer tends to be lowered. On the other hand, if the mixing ratio of the low melting point microcapsules ($M_L$) is lower than 1, it is difficult to suppress the phenomenon that the compressive stress fails to be linearly increased in accordance with increase in the smash thickness. It is more desirable for the mixing ratio (weight ratio) $M_H:M_L$ to fall within a range of between 90:10 and 99:1.

It is desirable for the microcapsules to have an average particle diameter falling within a range of between 1 and 200 μm. If the average particle diameter of the microcapsules is smaller than 1 μm, the wall defining the cell (void) is rendered excessively thick so as to make it difficult to obtain a high compressibility. On the other hand, if the average particle diameter of the microcapsules exceeds 200 μm, the wall defining the cell is rendered excessively thin so as to make the compressibility excessively high. In other words, it is possible for the blanket to be rendered excessively soft. It is more desirable for the average particle diameter of the microcapsules to fall within a range of between 30 and 200 μm. It is possible for an expanding treatment to be applied or not to be applied to the microcapsules as far as the average particle diameter of the microcapsules falls within a range of between 1 and 200 μm. Incidentally, the average particle diameter of the microcapsules is measured as follows.

Specifically, a small amount of microcapsules are put on the slide of a microscope and spreaded over the slide such that the microcapsule particles are positioned apart from each other. The reflex of the microscope is transferred into an electronic computer via a video camera and, then, the reflex is processed and analyzed so as to measure the particle radius. The average particle diameter is obtained by analyzing at least 1,000 microcapsules.

It is desirable for the microcapsule content of the unvulcanized compressible layer to fall within a range of between 5 and 15 parts by weight relative to 100 parts by weight of the rubber material. If the microcapsule content is lower than 5 parts by weight, it is possible for the amount of cells within the compressible layer to be insufficient, resulting in failure to obtain a sufficient compressible layer. On the other hand, if the microcapsule content exceeds 15 parts by weight, the rubber matrix partitioning the cells, i.e., cell wall, is rendered thin, with the result that it is possible for the cell wall to be buckled by the compressing force during use of the blanket.

It is desirable for the thickness of the compressible layer to fall within a range of between 0.2 and 0.6 mm. If the thickness of the compressible layer is smaller than 0.2 mm, it is difficult to impart a sufficient compressibility to the blanket. On the other hand, if the thickness of the compressible layer exceeds 0.6 mm, the ratio of the compressible layer in the blanket is increased, with the result that it is possible for the balance of the members constituting the blanket to be impaired. It is more desirable for the thickness of the compressible layer to fall within a range of between 0.2 mm and 0.4 mm.

(Second Process)

The vulcanizing treatment is applied to the unvulcanized compressible layer by:

a first heating process in which one surface of a compressible printing layer including the unvulcanized compressible layer containing microcapsules is heated by bringing the one surface of the compressible printing layer into contact with the surface of at least one heated metal roll while applying tension to the compressible printing layer; and a second heating process in which the other surface of the compressible printing layer is heated by bringing the other surface of the compressible printing layer into contact with the surface of at least one heated metal roll while applying tension to the compressible printing layer.

Each of the first heating process and the second heating process is carried out at least once. Where the total number of heating treatments including the first heating process and the second heating process is 3 or more, it is desirable to carry out the first heating process and the second heating process alternately in order to render the temperature distribution of the compressible printing layer uniform. In this case, it is desirable for the number of times of the first heating process to be equal to the number of times of the second heating process in order to heat the compressible printing layer more uniformly. Incidentally, if the number of times of the heat treatment is excessively small, the vulcanization is rendered insufficient. On the other hand, if the number of times of the heat treatment is excessively large, the vulcanizing time is rendered long. In addition, the thermal deterioration is brought about. Under the circumstances, it is desirable to determine the optimum number of times of the heat treatment in view of, for example, the roll diameter, the roll temperature and the length of the compressible printing layer.

If the number of metal rolls used in each of the first heating process and the second heating process is excessively small, the vulcanization is rendered insufficient. On the other hand, if the number of metal rolls noted above is excessively large, the vulcanizing time is rendered long. In addition, the thermal deterioration tends to be brought about. Under the circumstances, it is desirable to determine appropriately the number of metal rolls used in each of the first heating process and the second heating process in view of, for example, the roll diameter, the roll temperature and the number of heating treatments.

It is desirable for the temperature of the metal roll used for heating the compressible printing layer to be at least 120° C., more desirably, to fall within a range of between 120° C. and 160° C.

In the case of using mixed microcapsules containing the microcapsules having a low melting point and the microcapsules having a high melting point, it is desirable for the temperature of the metal roll used for heating the compressible printing layer to be not lower than the melting point of the low melting point microcapsules and to be lower than the melting point of the high melting point microcapsules. Under the particular condition, it is possible to melt selectively the microcapsules having a low melting point during the vulcanizing treatment so as to form cells of a foreign shape within the compressible layer.

Where microcapsules containing an acrylonitrile-vinylidene chloride copolymer as a constituting component are used as the microcapsules having a low melting point, and microcapsules containing a methacrylonitrile-acrylonitrile copolymer as a constituting component are used as the microcapsules having a high melting point, it is desirable for the temperature of the metal roll used for heating the compressible printing layer to fall within a range of between 120° C. and 170° C. It should be noted in this connection that it is possible to form cells of a foreign shape within the compressible layer by the melting of the microcapsules. If the temperature of the metal roll is lower than 120° C., however, the melting reaction of the microcapsules having a low melting point is unlikely to take place so as to lower the rate of formation of the cells having a foreign shape. On the other hand, if the temperature of the metal roll is higher than 170° C., the high melting point microcapsules are also subjected to the melting reaction together with the low melting point microcapsules, with the result that it is possible for the ratio of the cells having a foreign shape to be increased in the compressible layer so as to increase excessively the compressibility of the compressible layer. It is more desirable for the temperature of the metal roll to fall within a range of between 130° C. and 160° C.

It is desirable for the tension applied to the compressible printing layer to fall within a range of between 0.5 and 15 kgf/cm. If the tension is lower than 0.5 kgf/cm, the compressible printing layer tends to float from the roll surface, with the result that it is possible for the compressible printing layer to fail to be kept in contact with the roll surface for the sufficient time for vulcanizing the surface of the compressible printing layer. On the other hand, if the tension noted above is higher than 15 kgf/cm, it is possible for the residual strain of the fabric layer to be increased so as to shorten the life of the blanket. In addition, it is possible for the compressible layer to be collapsed entirely because of the buckling deformation of the microcapsules. In an extreme case, it is possible for the fabric layer contained in the compressible printing layer to be incapable of withstanding the tension so as to be broken. It is more desirable for the tension applied to the compressible printing layer to fall within a range of between 1 and 5 kgf/cm.

Further, it is desirable for the vulcanizing time to be not shorter than one minute and to be shorter than 60 minutes.

The second process will now be described in detail with reference to FIG. 1.

In the first step, prepared are four heated metal rolls $1a$ to $1d$. As shown in the drawing, a second roll $1b$ is arranged obliquely upward on the left side of a first roll $1a$, a third roll $1c$ is arranged obliquely upward on the right side of the second roll $1b$, and a fourth roll $1d$ is arranged obliquely upward on the left side of the third roll $1c$.

The vulcanizing treatment is applied to the unvulcanized compressible printing layer by bringing the unvulcanized compressible printing layer into contact with the surfaces of the first to fourth rolls $1a$ to $1d$ while applying tension to the unvulcanized compressible printing layer in the moving direction of the unvulcanized compressible printing layer. To be more specific, the compressible printing layer is returned along the surface of the first roll $1a$ so as to apply heating to one surface $2a$ of the compressible printing layer (first heating process). Then, the compressible heating layer is returned in the opposite direction along the surface of the second roll $1b$ so as to apply heating to the other surface $2b$ of the compressible printing layer (second heating process). Further, the compressible printing layer is returned along the surface of the third roll $1c$ such that the one surface $2a$ of the compressible printing layer is brought into contact with the surface of the third roll $1c$ so as to heat again the one surface $2a$ of the compressible printing layer (first heating process). Finally, the compressible printing layer is returned along the surface of the fourth roll $1d$ such that the other surface $2b$ of the compressible printing layer is brought into contact with the surface of the fourth roll $1d$ so as to heat again the other surface $2b$ of the compressible printing layer (second heating process), thereby finishing the vulcanizing treatment of the compressible printing layer.

If the vulcanizing treatment is carried out by the method described above, pressure is not applied to the compressible printing layer in the thickness direction of the compressible printing layer, and it is possible to maintain constant the tension applied to the compressible printing layer. It follows that it is possible to avoid the collapsing of the compressible layer and to decrease the nonuniformity in the thickness of the compressible layer. Also, it is possible to heat directly the compressible printing layer by the heat rolls from both surfaces of the compressible printing layer so as to increase the temperature elevation rate of the compressible layer and, at the same time, to heat uniformly the compressible layer. It follows the vulcanizing time can be shortened.

Incidentally, FIG. 1 shows that four heating rolls are used for applying a vulcanizing treatment to the unvulcanized compressible layer. However, it is also possible to use two, three, five or more heating rolls for the vulcanizing treatment.

Figure 2:
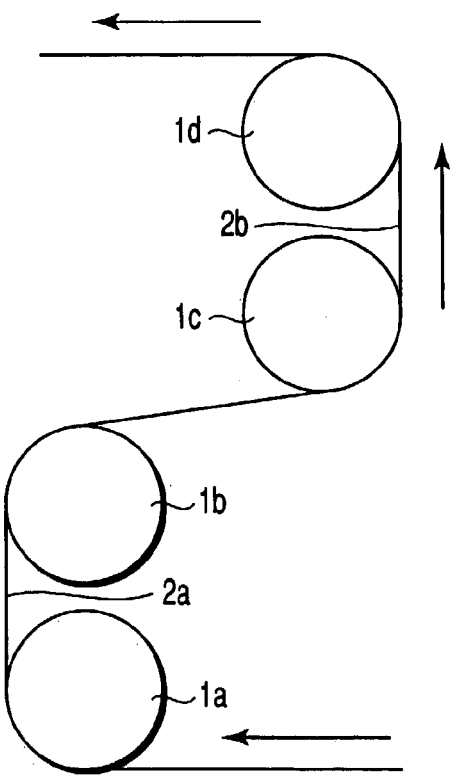
FIG. 2 schematically shows another example of the arrangement of metal rolls used in the vulcanizing process included in the manufacturing method of the compressible printing layer of the present invention.

Also, in the system shown in FIG. 1, a single heating metal roll is used in each of the first heating process and the second heating process. However, it is also possible to use a plurality of heating metal rolls in each of the first heating process, the second heating process and the first and second heating processes. FIG. 2 exemplifies the particular system.

As shown in FIG. 2, four heated metal rolls $1a$ to $1d$ are prepared. A second roll $1b$ is arranged right above a first roll 1a, a third roll 1c is arranged obliquely upward on the right side of the second roll 1b, and a fourth roll 1d is arranged right above the third roll 1c.

The vulcanizing treatment is applied to the unvulcanizing compressible printing layer by moving the compressible printing layer along the surfaces of the first to fourth rolls 1a to 1d while applying tension to the compressible printing layer in the moving direction of the compressible printing layer. Specifically, one surface 2a of the compressible printing layer is brought into contact with the surfaces of the first roll 1a the second roll 1b so as to heat the one surface 2a of the compressible printing layer, thereby performing the first heating process. Then, the other surface 2b of the compressible printing layer is brought into contact with the surfaces of the third roll 1c and the fourth roll 1d so as to heat the other surface 2b of the compressible printing layer, thereby performing the second heating process and, thus, finishing the vulcanizing treatment of the compressible printing layer.

In the system shown in each of FIGS. 1 and 2, the vulcanizing treatment is performed by bringing once the unvulcanizing compressible printing layer into contact with the surface of each of the metal rolls. Alternatively, it is also possible to circulate the compressible printing layer through a plurality of metal rolls such that the compressible printing layer is brought back to the first metal roll after the compressible metal roll is brought into contact once with each of the metal rolls for performing the vulcanizing treatment. In view of the productivity, it is desirable to bring once the compressible printing layer into contact with each of the metal rolls for performing the vulcanizing treatment.

In the manufacturing method of the present invention, it is possible to eliminate the phenomenon that the compressive stress is maintained substantially constant in spite of the increase in the smash thickness by using the mixed microcapsules containing microcapsules having a low melting point and high melting point microcapsules having a melting point higher than that of the low melting point microcapsules and by setting the temperature of the metal roll to be not lower than the melting point of the low melting point microcapsules and lower than the melting point of the high melting point microcapsules.

To be more specific, if the vulcanizing treatment is performed by winding an unvulcanizing compressible printing layer containing both low melting point microcapsules and high melting point microcapsules around a metal drum and by putting the metal drum inside a double-walled can having steam introduced onto the outside, the low melting point microcapsules on the inner circumferential side of the compressible printing layer tend to be softened so as to cause a compressive deformation by the pressure, because a heavy load is applied to the inner circumferential side of the compressible printing layer by the weight of the compressible printing layer itself. If the compressive deformation is generated, the porosity of the compressible printing layer is decreased, with the result that the compressibility is lowered on the inner circumferential side of the compressible printing layer. It should also be noted that, since the thermal diffusion rate to the compressible printing layer is low, the compressible layer is rendered large in nonuniformity of the temperature distribution, with the result that the forming ratio of the cells having a foreign shape, which are formed by the melting of the microcapsules having a low melting point, tends to be rendered nonuniform.

If the particular compressible printing layer is used in a blanket for printing, the phenomenon that the compression stress is not increased in spite of the application of the smash thickness takes place so as to bring about an inconvenience that the printed surface is blurred.

To reiterate, the manufacturing method of the present invention comprises a first heating process in which one surface of an unvulcanizing compressible printing layer containing both microcapsules having a low melting point and microcapsules having a high melting point is brought into contact with the surface of at least one heated metal roll while applying tension to the compressible printing layer so as to heat the one surface of the compressible printing layer, and a second heating process in which the other surface of the compressible printing layer is brought into contact with the surface of at least one heated metal roll while applying tension to the compressible printing layer so as to heat the other surface of the compressible printing layer, thereby applying a vulcanizing treatment to the compressible layer. The particular method of the present invention permits improving the thermal diffusion rate to the compressible layer so as to increase the uniformity in the temperature distribution of the compressible layer. As a result, it is possible to bring about uniformly the melting reaction of the microcapsules having a low melting point so as to decrease the nonuniformity in the ratio of the cells having a foreign shape in the compressible layer.

It should also be noted that pressure is not applied in the thickness direction of the compressible printing layer, and that it is possible to maintain constant the tension applied to the compressible printing layer. It follows that it is possible to suppress the phenomenon that the microcapsules are collapsed by the melting so as to decrease the nonuniformity in the compressibility in the longitudinal direction of the compressible printing layer. Under the circumstances, it is possible to narrow the region of the smash thickness in which the smash thickness and compressive stress are not proportional, making it possible to control more accurately the concentration of the printed surface by the smash thickness.

Also, the mixing ratio (weight ratio) $M_H:M_L$ of the microcapsules ($M_H$) having a high melting point to the microcapsules ($M_L$) having a low melting point is set to fall within a range of between 80:20 and 99:1 in the present invention. As a result, it is possible to set the ratio $S_1:S_2$ of the spherical cells $S_1$ to the cells $S_2$ of a foreign shape to fall within a range of between 80:20 and 99:1 so as to make it possible to increase substantially linearly the compressive stress with increase in the smash thickness.

Incidentally, it is possible to incorporate the unvulcanizing compressive printing layer in a blanket for printing and to apply the vulcanizing method of the present invention to the blanket having the unvulcanizing compressible printing layer incorporated therein.

The manufacturing method of a blanket for printing of the present invention will now be described.

The method of the present invention for manufacturing a blanket for printing comprises the step of preparing a laminate structure including an unvulcanizing surface rubber layer, at least two fabric layers, and a compressible printing layer prepared by the method of the present invention described above and arranged between the surface rubber layer and the at least two fabric layers, and the step of applying a vulcanizing treatment to the laminate structure noted.

A sheet of, for example, a rubber mixture can be used as the unvulcanizing surface rubber layer. The rubber material contained in the rubber mixture includes, for example, an acrylonitrile-butadiene rubber.

As described above, at least two fabric layers are included in the blanket for printing manufactured by the method of the present invention. These fabric layers are in the form of a laminate structure prepared by bonding at least two fabric layers by using an adhesive layer so as to make these fabric layers integral. The adhesive layer contains an oil resistant rubber matrix as a main component. Also, it is possible to use the rubber materials and the additives similar to those described previously in conjunction with the compressible layer.

The vulcanizing treatment applied to the laminate structure is carried out in an attempt to vulcanize mainly the surface rubber layer. It is desirable to set the vulcanizing temperature to fall within a range of between 120° C. and 160° C.

An example of a blanket for printing manufactured by the method of the present invention will now be described with reference to FIG. 3.

As shown in the drawing, the blanket for printing comprises a surface rubber layer 3 and a compressible printing layer 4. The compressible printing layer 4 includes a compressible layer 7 containing spherical cells 5 and cells 6 having a foreign shape and fabric layers 8a and 8b laminated on both surfaces of the compressible layer 7. Also, the compressible printing layer 4 is bonded to the surface rubber layer 3 with an adhesive layer 9 interposed therebetween. A fabric layer 11 is bonded to the fabric layer 8b of the compressible printing layer 4 with an adhesive layer 10 interposed therebetween. Further, an additional fabric layer 13 is bonded to the fabric layer 11 with an adhesive layer 12 interposed therebetween.

The cells having a foreign shape represent cells other than the spherical cells and include, for example, cells having an elliptical cross section, cells having a vertically oblong cross section, cells having a flat cross section, and amorphous cells. The foreign-shaped cells 6 shown in FIG. 3 include, for example, amorphous cells and elliptical cells. It is desirable for the ratio $S_1$ (spherical cells 5): $S_2$ (foreign-shaped cells 6) of the spherical cells 5 to the foreign-shaped cells 6 to fall within a range of between 20:80 and 99:1. If the ratio $S_2$ of the cells 6 having a foreign shape is less than 1, the ratio of the relative thick cell walls formed of the rubber matrix and partitioning the adjacent cells is rendered insufficient so as to make it difficult to eliminate the phenomenon that the compressive stress is not linearly increased when the smash thickness is increased. On the other hand, if the ratio $S_2$ of the foreign-shaped cells 6 exceeds 80, the compressible layer fails to play its original role, with the result that it is possible for the restoring force relative to the compression to be rendered insufficient. It is more desirable for the ratio $S_1:S_2$ to fall within a range of between 10:90 and 99:1.

Examples of the present invention will now be described in detail with reference to the accompanying drawings.

EXAMPLE 1

<Preparation of Rubber Paste for Compressible Layer>

Mixed with 100 parts by weight of a medium high acrylonitrile-butadiene rubber (NBR) were sulfur, a vulcanization accelerator M (2-mercapto benzothiazole), an antioxidant, a reinforcing agent and a plasticizer, followed by dissolving the resultant mixture in methyl ethyl ketone.

Then, 12 parts by weight of "Exbancell 092DE" (trade name of microballoons formed of a methacrylonitrile-acrylonitrile copolymer, manufactured by Novel Industries Inc. and having a melting point not lower than 150° C.), which was used as microcapsules having a high melting point, and 3 parts by weight of "Exbancell 551DE" (trade name of microballoons formed of an acrylonitrile-vinylidene chloride copolymer, manufactured by Novel Industries Inc. and having a melting point of about 80° C.), which was used as microcapsules having a low melting point, were added to the rubber mixture thus obtained. The weight ratio $M_H:M_L$ Of the high melting point microcapsules ($M_H$) to the low melting point microcapsules ($M_L$) was 80:20.

<Lamination-Bonding Process>

Prepared as the fabric layer were two cotton fabric sheets each having a thickness of about 0.4 mm. One cotton fabric sheet was coated with the rubber paste in a thickness of 0.3 mm so as to form an unvulcanizing compressible layer. Then, the other cotton fabric sheet was bonded to the coated rubber paste layer so as to obtain an unvulcanizing compressible printing layer.

<Vulcanizing Process>

Prepared were six metal rolls each heated to 145° C., and first to fourth heated metal rolls were arranged as shown in FIG. 1. The fifth heated metal roll was arranged obliquely upward on the right side of the fourth heated metal roll. Further, the sixth heated metal roll was arranged obliquely upward on the left side of the fifth heated metal roll.

The unvulcanizing compressible printing layer was brought into contact with the surfaces of the first to sixth heated metal rolls while applying tension of 3 kgf/cm to the compressible printing layer in the moving direction of the compressible printing layer so as to vulcanize the compressible printing layer. It should be noted that the vulcanizing process included a first heating process, in which one surface of the compressible printing layer was brought into contact with the surfaces of the first, third and fifth heated metal rolls, and a second heating process, in which the other surface of the compressible printing layer was brought into contact with the surfaces of the second, fourth and sixth heated metal rolls. In other words, the first heating process and the second heating process were carried out alternately.

The vulcanizing treatment was continuously carried out for 50 minutes so as to finish the vulcanization for 30 meters of the compressible printing layer.

EXAMPLE 2

A compressible printing layer was obtained as in Example 1, except that microcapsules having a high melting point were used singly as the microcapsules.

Comparative Example 1

An unvulcanizing compressible printing layer having a length of 30 meters was prepared as in Example 1. The compressible printing layer thus prepared was wound around a metal drum and, then, the metal drum was housed in a vulcanizing can so as to carry out a vulcanizing treatment at 145° C. for 6 hours, thereby obtaining a compressible printing layer.

The accuracy in thickness before and after the vulcanizing treatment was measured for 30 meters of the compressible printing layer prepared in each of Examples 1, 2 and Comparative Example 1, with the result as shown in Table 1:

TABLE 1

(Accuracy in Thickness for 30 Meters)

| Accuracy before vulcanization | Accuracy after vulcanization (Example 1) | Accuracy after vulcanization (Example 2) | Accuracy after vulcanization (Comparative Example 1) |
|---|---|---|---|
| 1.00 ± 0.02 mm | 1.00 ± 0.02 mm | 1.00 ± 0.02 mm | 1.00 ± 0.05 mm |

As apparent from Table 1, the accuracy in the thickness of the compressible printing layer before the vulcanizing treatment remains unchanged after the vulcanizing treatment in the method for each of Examples 1 and 2. On the other hand, the nonuniformity in the thickness of the compressible printing layer after the vulcanizing treatment is rendered larger than that before the vulcanizing treatment in the method of Comparative Example 1.

EXAMPLE 3 to 5

A compressible printing layer was prepared as in Example 1, except that the mixing ratio of the microcapsules having a high melting point to the microcapsules having a low melting point was changed as shown in Table 2.

A blanket for printing was prepared as follows by using the compressible printing layer prepared in each of Examples 1, 3 to 5, and Comparative Example 1.

<Preparation of Rubber Paste for Adhesive Layer>

Mixed with 100 parts by weight of a medium high acrylonitrile-butadiene rubber (NBR) were sulfur, a vulcanization accelerator M (2-mercapto benzothiazole), an antioxidant, a reinforcing agent and a plasticizer, followed by dissolving the resultant mixture in methyl ethyl ketone so as to prepare a rubber paste for the adhesive layer.

<Lamination-Bonding Process>

A cotton fabric sheet 8b included in the compressible printing layer 4 was coated with the rubber paste for adhesive in a thickness of 0.05 mm so as to form an unvulcanizing adhesive layer 10, followed by bonding a cotton fabric sheet 11 used as a first fabric cloth layer to the adhesive layer 10. Further, the surface of the cotton fabric sheet 11 was coated with the rubber paste for adhesive in a thickness of 0.05 mm so as to form an unvulcanizing adhesive layer 12, followed by bonding a cotton fabric sheet 13 used as a second fabric cloth layer to the adhesive layer 12.

On the other hand, the surface of a cotton fabric sheet 8a included in the compressible printing layer 4 was coated with the rubber paste for adhesive in a thickness of 0.05 mm so as to form an unvulcanizing adhesive layer 9, followed by laminating a sheet of an acrylonitrile-butadiene rubber mixture used as an unvulcanizing surface rubber layer 3 to the unvulcanizing adhesive layer 9 so as to obtain an unvulcanizing blanket for printing (blanket precursor) having a thickness of about 2.1 mm.

<Vulcanizing Process>

The unvulcanizing compressible rubber blanket was wound around a metal drum, followed by heating the metal drum at 150° C. for 6 hours within a vulcanizing can so as to finish the vulcanization of the surface rubber layer.

Figure 3:
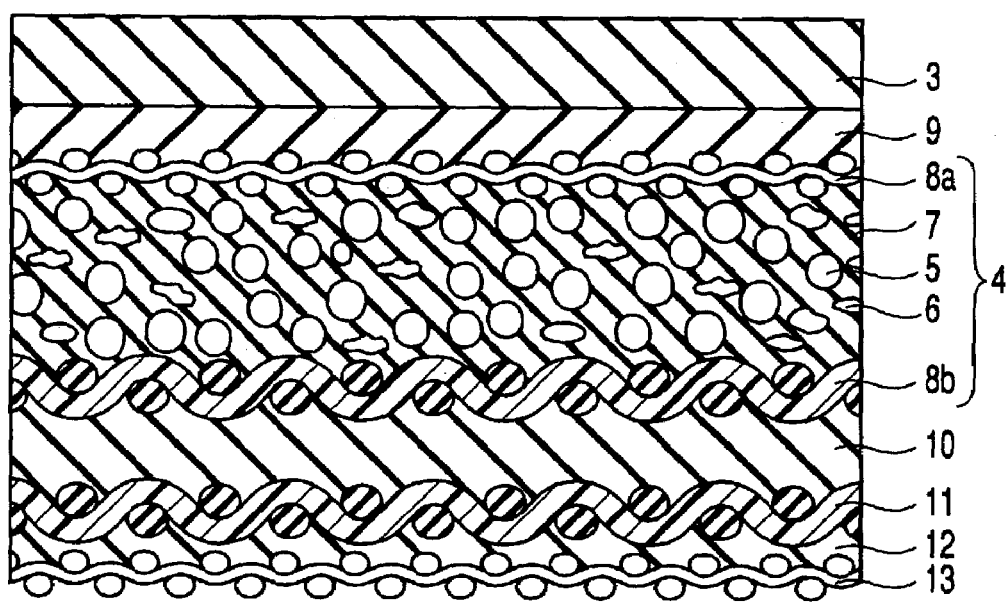
FIG. 3 schematically shows an example of the blanket for printing which comprises the compressible printing layer manufactured by the method of the present invention.

Then, after cooling, the surface rubber layer was polished with sand paper of 240 mesh so as to obtain a compressible blanket having a thickness of 1.9 mm, which was constructed as shown in FIG. 3.

Each of the compressible printing layers for Examples 1, 3 to 5 and Comparative Example 1 was cut in a direction perpendicular to the surface of the fabric cloth layer so as to prepare pieces of the compressible printing layer each having a length of one meter. The number of spherical cells and the number of foreign-shaped cells other than the spherical cells in each of the cut surfaces in which the laminate structure was exposed to the outside were counted so as to calculate the number $S_1$ of the spherical cells per unit area (1 mm$^2$) and the number $S_2$ of the foreign-shaped cells per unit area (1 mm$^2$). Table 2 also shows the ratio $S_1:S_2$ of the number $S_1$ of the spherical cells per unit area to the number $S_2$ of the foreign-shaped cells per unit area.

Figure 4:
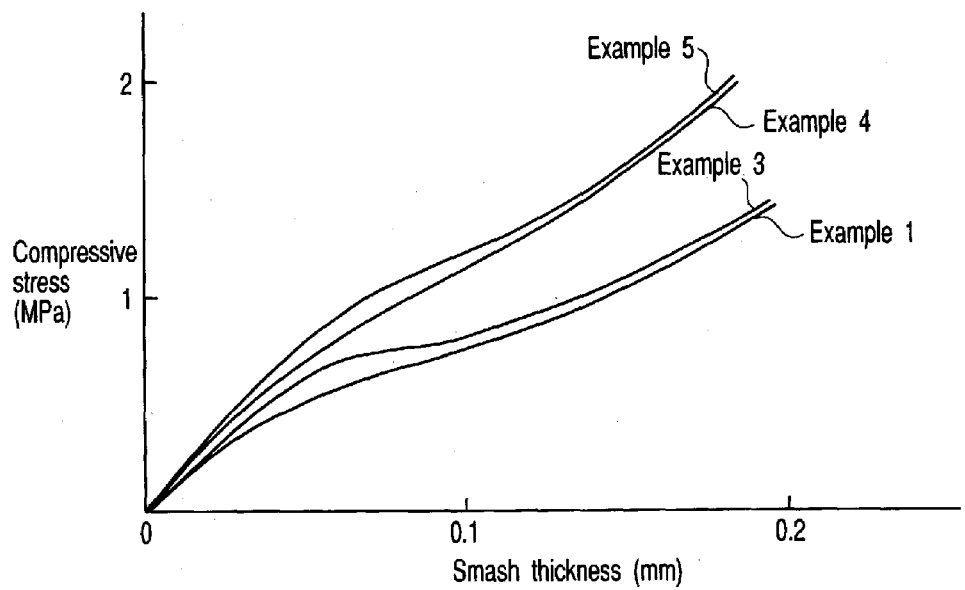
FIG. 4 is a graph showing the relationship between the smash thickness and the compressive stress in the blankets for printing for Examples 1 and 3 to 5 of the present invention.
Figure 5:
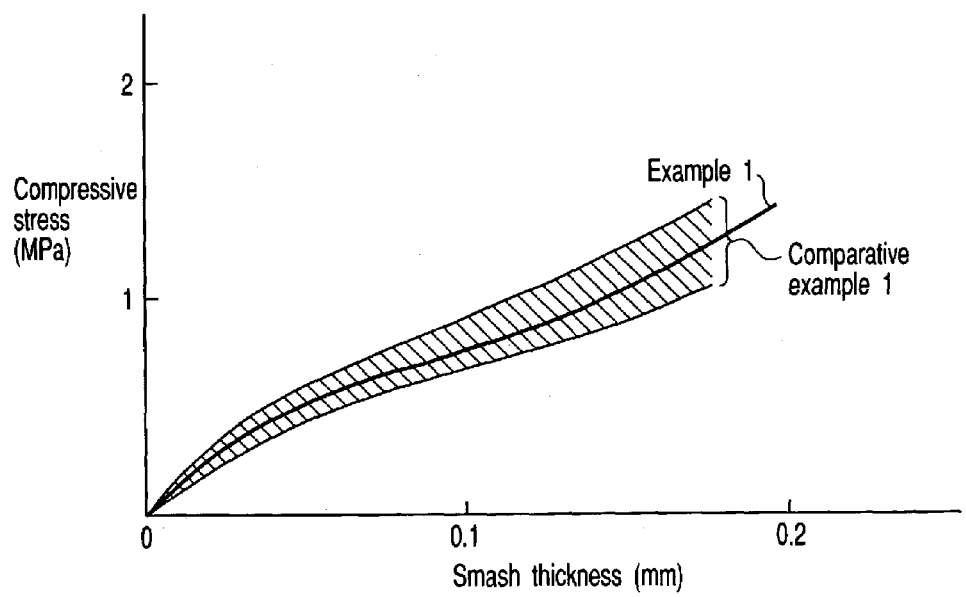
FIG. 5 is a graph showing the relationship between the smash thickness and the compressive stress in the blankets for printing for Example 1 of the present invention and for Comparative Example 1.

Also, columns each having a diameter of 28 mm were pushed into each of the compressible printing layers prepared in Examples 1, 3 to 5 and Comparative Example 1 at a compression speed of 2 mm/min so as to measure the compressive stress. The columns were pushed into the compressible printing layer one meter apart from each other. FIGS. 4 and 5 are graphs each showing the curves of the compressive stress thus obtained. In the graph of each of FIGS. 4 and 5, the smash thickness (pushing amount, mm) is plotted on the abscissa, with the compressive stress (MPa) being plotted on the ordinate.

TABLE 2

| | Mixing amount of high melting point microcapsules (parts by weight) | Mixing amount of low melting point microcapsules (parts by weight) | Weight ratio ($M_H:M_L$) | Cell ratio ($S_1:S_2$) |
|---|---|---|---|---|
| Example 1 | 12 | 3 | 80:20 | 80:20 |
| Example 3 | 14.85 | 0.15 | 99:1 | 99:1 |
| Example 4 | 4 | 1 | 80:20 | 80:20 |
| Example 5 | 4.95 | 0.05 | 99:1 | 99:1 |
| Comparative Example 1 | 12 | 3 | 80:20 | 80:20–85:15 |

As apparent from Table 2 and FIGS. 4 and 5, the compressible blanket for each of Examples 1 and 3 to 5 exhibited a constant value of the cell ratio ($S_1: S_2$) measured at portions one meter apart from each other. Also, concerning the compressive stress curve prepared by the measurements at portions one meter apart from each other, the compressive stress curve was not markedly changed depending on the difference in the measuring portions.

Further, the comparison between Example 1 and Example 3 indicates that the compressive stress is increased more linearly when the smash thickness (pushing amount of the column) is increased in Example 1 having a larger weight ratio $M_L$ of the microcapsules having a low melting point. On the other hand, the comparison between Examples 1, 3 and Examples 4, 5 indicates that the compressibility for Examples 4, 5 having a smaller microcapsule content of 5% by weight is lower than that for Examples 1, 3.

On the other hand, the compressible blanket for Comparative Example 1 exhibited cell ratios $S_1:S_2$ differing from each other depending on the measuring portions. Also, the accuracy of thickness was nonuniform. As a result, the compressive stress curves were different from each other.

EXAMPLE 6 to 8

A compressible printing layer was prepared as in Example 1, except that the tension applied to the compressible printing layer during the vulcanizing treatment was changed to 0.5 kgf/cm (Example 6), to 10 kgf/cm (Example 7), and to 15 kgf/cm (Example 8). No breakage was recognized in the fabric layer included in the compressible printing layer. Also, the accuracy of thickness after the vulcanizing treatment was found to remain unchanged from the accuracy of thickness before the vulcanizing treatment.

As described above in detail, the present invention provides a manufacturing method of a compressible printing layer small in nonuniformity of the thickness and a manufacturing method of a blanket for printing which permits decreasing the nonuniformity in the thickness of a compressible printing layer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A manufacturing method of a compressible printing layer, comprising a vulcanizing step comprising:
    a first heating process in which one surface of a compressible printing layer including an unvulcanized compressible layer containing microcapsules is heated by bringing the one surface of the compressible printing layer into contact with a surface of at least one first heated metal roll while applying tension to the compressible printing layer; and
    a second heating process in which the other surface of the compressible printing layer is heated by bringing the other surface of the compressible printing layer into contact with a surface of at least one second heated metal roll while applying tension to the compressible printing layer,
    wherein said microcapsules contain microcapsules having a low melting point and microcapsules having a high melting point, and each of said at least one first heated metal roll and said at least one second heated metal roll has a temperature falling within a range not lower than the melting point of the microcapsules having a low melting point and lower than the melting point of the microcapsules having a high melting point.

2. The manufacturing method of a compressible printing layer according to claim 1, wherein said microcapsule having a low melting point contains an acrylonitrile-vinylidene chloride copolymer as a constituting component, and said microcapsules having a high melting point contains a methacrylonitrile-acrylonitrile copolymer as a constituting component.

3. The manufacturing method of a compressible printing layer according to claim 1, wherein said microcapsule having a low melting point has a melting point falling within a range of between 80° C. and 120° C., and said microcapsule having a high melting point has a melting point falling within a range between 130° C. and 180° C.

4. The manufacturing method of a compressible printing layer according to claim 1, wherein each of said at least one first heated metal roll and said at least one second heated metal roll has a temperature falling within a range of between 120° C. and 170° C.

5. The manufacturing method of a compressible printing layer according to claim 1, wherein the mixing ratio $M_H:M_L$ by weight of said high melting point microcapsules ($M_H$) and weight of said low melting point microcapsules ($M_L$) falls within a range of between 80:20 and 99:1.

6. A manufacturing method of a blanket for printing, comprising:
    preparation of a laminate structure including an unvulcanized surface rubber layer, at least two fabric layers, and a compressible printing layer prepared according to the method of claim 1 and arranged between the unvulcanized surface rubber layer and the at least two fabric layers; and
    application of a vulcanizing treatment to said laminate structure.

* * * * *